US009327239B2

(12) United States Patent
Morgan

(10) Patent No.: US 9,327,239 B2
(45) Date of Patent: May 3, 2016

(54) FILTER SUBSTRATE COMPRISING THREE-WAY CATALYST

(71) Applicant: Johnson Matthey Public Limited Company, London (GB)

(72) Inventor: Christopher Gough Morgan, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/245,307

(22) Filed: Apr. 4, 2014

(65) Prior Publication Data

US 2014/0301924 A1 Oct. 9, 2014

(51) Int. Cl.
*B01D 53/34* (2006.01)
*B01D 53/56* (2006.01)
(Continued)

(52) U.S. Cl.
CPC .......... *B01D 53/9454* (2013.01); *B01D 53/945* (2013.01); *B01D 2255/1021* (2013.01);
(Continued)

(58) Field of Classification Search
CPC ........ B01D 53/945; F01N 3/021; B01J 35/02; B01J 35/023; B01J 35/04; B01J 35/10; B01J 21/04; B01J 21/066; B01J 23/10; B01J 23/40; B01J 23/42; B01J 23/44; B01J 23/464; B01J 23/56; B01J 23/63; B01J 23/70; B01J 23/72; B01J 23/745; B01J 29/0333; B01J 29/0356; B01J 29/044; B01J 29/072
USPC .................. 423/213.2, 213.5, 213.7; 60/299; 422/180; 502/64–66, 74, 302–304, 502/326–327, 332–334, 338–341, 345, 349, 502/355, 439
See application file for complete search history.

(56) References Cited

U.S. PATENT DOCUMENTS 5,057,483 A 10/1991 Wan
5,473,887 A 12/1995 Takeshima et al.
(Continued)

FOREIGN PATENT DOCUMENTS

DE 102004040548 A1 2/2006
DE 102010055147 A1 6/2012
(Continued)

OTHER PUBLICATIONS

Hall et al., "Measurement of the Number and Size Distribution of Particles Emitted from a Gasoline direct Injection Vehicle," SAE Technical Paper Series 1999-01-3530, pp. 1-11.
(Continued)

*Primary Examiner* — Cam N. Nguyen
(74) *Attorney, Agent, or Firm* — Gary D. Mangels

(57) ABSTRACT

A catalysed filter for filtering particulate matter from exhaust gas comprising one or more catalyst poisons and emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a washcoat comprising a plurality of solid particles, wherein the porous structure of the washcoated porous substrate contains pores of a second mean pore size, wherein the second mean pore size is less than the first mean pore size, which washcoat being axially arranged on the porous substrate as a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone≥100%, wherein the washcoat of at least the second zone is a three-way catalyst washcoat comprising one or more precious metal supported on a high surface area oxide, and an oxygen storage component and wherein:

(i) a specific surface area of washcoat in the first zone>second zone; or
(ii) both a washcoat loading and a specific surface area of washcoat in the first zone>second zone.

20 Claims, 3 Drawing Sheets

(51) Int. Cl.
  *B01D 53/94* (2006.01)
  *B01D 50/00* (2006.01)
  *B01J 8/02* (2006.01)
  *C01B 21/00* (2006.01)
  *C01B 23/00* (2006.01)
  *C01B 25/00* (2006.01)
  *C01B 31/00* (2006.01)
  *C01B 33/00* (2006.01)
  *C01B 35/00* (2006.01)
  *C01G 28/00* (2006.01)
  *C01G 30/00* (2006.01)
  *F01N 3/10* (2006.01)
  *B01J 23/00* (2006.01)
  *B01J 23/02* (2006.01)
  *B01J 23/06* (2006.01)
  *B01J 23/08* (2006.01)
  *B01J 23/10* (2006.01)
  *B01J 23/40* (2006.01)
  *B01J 23/42* (2006.01)
  *B01J 23/44* (2006.01)
  *B01J 23/56* (2006.01)
  *B01J 23/70* (2006.01)
  *B01J 23/74* (2006.01)
  *B01J 21/04* (2006.01)
  *B01J 29/06* (2006.01)
  *F01N 3/035* (2006.01)

(52) U.S. Cl.
  CPC . *B01D2255/1023* (2013.01); *B01D 2255/1025* (2013.01); *B01D 2255/908* (2013.01); *B01D 2255/9032* (2013.01); *B01D 2255/9155* (2013.01); *B01D 2255/9207* (2013.01); *B01D 2258/014* (2013.01); *F01N 3/035* (2013.01); *F01N 3/101* (2013.01); *Y02T 10/22* (2013.01)

(56) References Cited

U.S. PATENT DOCUMENTS

| | | | |
|---|---|---|---|
| 5,898,014 A | 4/1999 | Wu et al. | |
| 6,423,293 B1 | 7/2002 | Chun et al. | |
| 7,393,808 B2 | 7/2008 | Yoshida et al. | |
| 7,550,117 B2 | 6/2009 | Alward et al. | |
| 7,572,416 B2 | 8/2009 | Alward et al. | |
| 7,772,151 B2* | 8/2010 | Li et al. | 502/339 |
| 7,785,544 B2 | 8/2010 | Alward et al. | |
| 8,012,439 B2* | 9/2011 | Arnold et al. | 423/212 |
| 8,211,393 B2* | 7/2012 | Arnold et al. | 423/213.2 |
| 8,404,203 B2* | 3/2013 | Bull et al. | 423/213.5 |
| 8,475,752 B2 | 7/2013 | Wan | |
| 8,512,657 B2* | 8/2013 | Arnold et al. | 423/213.2 |
| 8,540,952 B2* | 9/2013 | Swallow et al. | 423/213.2 |
| 8,608,820 B2* | 12/2013 | Arnold et al. | 55/523 |
| 8,637,426 B2* | 1/2014 | Hoke et al. | 502/339 |
| 8,640,440 B2 | 2/2014 | Klingmann et al. | |
| 8,652,429 B2 | 2/2014 | Sumiya et al. | |
| 8,667,785 B2* | 3/2014 | Blakeman et al. | 60/299 |
| 8,668,891 B2 | 3/2014 | Blakeman et al. | |
| 8,735,311 B2* | 5/2014 | Bull et al. | 502/60 |
| 8,789,356 B2* | 7/2014 | Phillips et al. | 60/274 |
| 8,795,617 B2* | 8/2014 | Swallow et al. | 423/213.2 |
| 8,815,189 B2* | 8/2014 | Arnold et al. | 423/213.2 |
| 8,919,110 B2* | 12/2014 | Arnold et al. | 60/299 |
| 2003/0126133 A1 | 7/2003 | Dattatri et al. | |
| 2004/0191133 A1 | 9/2004 | Yamaguchi | |
| 2006/0039843 A1 | 2/2006 | Patchett et al. | |
| 2006/0057046 A1 | 3/2006 | Punke et al. | |
| 2007/0012028 A1 | 1/2007 | Weissman et al. | |
| 2007/0104623 A1 | 5/2007 | Dettling et al. | |
| 2008/0045405 A1 | 2/2008 | Beutel et al. | |
| 2008/0053070 A1 | 3/2008 | Hatton | |
| 2008/0124514 A1 | 5/2008 | Fujdala et al. | |
| 2009/0087365 A1 | 4/2009 | Klingmann et al. | |
| 2009/0129995 A1 | 5/2009 | Pfeifer et al. | |
| 2009/0193796 A1* | 8/2009 | Wei et al. | 60/297 |
| 2009/0274602 A1* | 11/2009 | Alward et al. | 423/239.1 |
| 2009/0288402 A1* | 11/2009 | Voss et al. | 60/299 |
| 2010/0058746 A1 | 3/2010 | Pfeifer et al. | |
| 2010/0077727 A1 | 4/2010 | Southward et al. | |
| 2010/0077738 A1 | 4/2010 | Cavataio et al. | |
| 2010/0092358 A1 | 4/2010 | Koegel et al. | |
| 2010/0126133 A1 | 5/2010 | Fekety et al. | |
| 2010/0275579 A1 | 11/2010 | Klingmann et al. | |
| 2011/0158871 A1 | 6/2011 | Arnold et al. | |
| 2011/0176969 A1 | 7/2011 | Michiaki et al. | |
| 2011/0179777 A1 | 7/2011 | Chandler et al. | |
| 2011/0185709 A1 | 8/2011 | Zhang et al. | |
| 2011/0201493 A1 | 8/2011 | Goto et al. | |
| 2011/0252773 A1 | 10/2011 | Arnold et al. | |
| 2011/0271664 A1* | 11/2011 | Boorse et al. | 60/301 |
| 2012/0129690 A1 | 5/2012 | Larcher et al. | |
| 2013/0149207 A1* | 6/2013 | Castagnola et al. | 422/177 |
| 2013/0149223 A1* | 6/2013 | Blakeman et al. | 423/213.5 |
| 2013/0243659 A1 | 9/2013 | Sutton et al. | |
| 2014/0044626 A1* | 2/2014 | Greenwell | 423/212 |
| 2014/0154163 A1* | 6/2014 | Andersen et al. | 423/237 |
| 2014/0186228 A1* | 7/2014 | Arnold et al. | 422/180 |
| 2014/0186244 A1* | 7/2014 | Blakeman et al. | 423/213.5 |
| 2014/0219879 A1* | 8/2014 | Bull et al. | 422/170 |
| 2014/0227155 A1* | 8/2014 | Phillips et al. | 423/212 |
| 2014/0234189 A1* | 8/2014 | Clowes et al. | 423/213.5 |
| 2014/0271422 A1* | 9/2014 | Tang | 423/212 |
| 2014/0271426 A1* | 9/2014 | Casci et al. | 423/213.2 |
| 2014/0271429 A1* | 9/2014 | Kazi et al. | 423/213.5 |
| 2014/0301923 A1* | 10/2014 | Tang et al. | 423/212 |
| 2014/0322112 A1 | 10/2014 | Blakeman et al. | |
| 2014/0322113 A1 | 10/2014 | Blakeman et al. | |

FOREIGN PATENT DOCUMENTS

| | | |
|---|---|---|
| DE | 102011050788 A1 | 12/2012 |
| EP | 0766993 A3 | 5/1997 |
| EP | 1108864 A3 | 6/2001 |
| EP | 1136115 A1 | 9/2001 |
| EP | 1663458 B1 | 6/2006 |
| EP | 2042225 A1 | 4/2009 |
| EP | 2042226 A2 | 4/2009 |
| EP | 2184459 A1 | 5/2010 |
| EP | 1057519 B2 | 8/2011 |
| EP | 2650042 A1 | 10/2013 |
| FR | 2928176 A1 | 9/2009 |
| GB | 2406803 A | 4/2005 |
| GB | 2476585 A | 6/2011 |
| GB | 2497441 A | 6/2013 |
| GB | 2497442 A | 6/2013 |
| GB | 2468210 B | 9/2013 |
| JP | 2005264866 A | 9/2005 |
| WO | 9947260 A1 | 9/1999 |
| WO | 0116050 A1 | 3/2001 |
| WO | 0180978 A1 | 11/2001 |
| WO | 2006031600 A1 | 3/2006 |
| WO | 2007011498 A1 | 1/2007 |
| WO | 2008022967 A1 | 2/2008 |
| WO | 2008132452 A2 | 11/2008 |
| WO | 2009079590 A1 | 6/2009 |
| WO | 2009089156 A1 | 7/2009 |
| WO | 2009100097 A2 | 8/2009 |
| WO | 2009043390 A3 | 9/2009 |
| WO | 2010004320 A2 | 1/2010 |
| WO | 2010097634 A1 | 9/2010 |
| WO | 2011015615 A1 | 2/2011 |
| WO | 2011077139 A1 | 6/2011 |
| WO | 2011080525 A1 | 7/2011 |
| WO | 2011110919 A1 | 9/2011 |

(56) References Cited

FOREIGN PATENT DOCUMENTS

| | | | |
|---|---|---|---|
| WO | 2012069405 | A1 | 5/2012 |
| WO | 2014174277 | A1 | 10/2014 |

OTHER PUBLICATIONS

Wei et al., "Single-Stage Dilution Tunnel Performance," SAE Technical Papers 2001-01-0201, SAE 2001 World Congress, Mar. 5-8, 2001, pp. 1-14.

Howitt et al., "Cellular Ceramic Diesel Particulate Filter," SAE Technical Papers 810114.

Abdul-Khalek et al., "Diesel Exhaust Particle Size: Measurement Issues and Trends," SAE Technical Paper Series 980525, Int'l Congress and Exposition, Feb. 23-26, 1998, pp. 1-16.

* cited by examiner

FILTER SUBSTRATE COMPRISING THREE-WAY CATALYST

CROSS-REFERENCE TO RELATED APPLICATIONS

This application claims priority benefit of Great Britain Patent Application No. 1306164.3 filed on Apr. 5, 2013, the disclosure of which is incorporated herein by reference in its entirety for all purposes.

FIELD OF THE INVENTION

The present invention relates to a filter catalysed with a three-way catalyst for filtering particulate matter from exhaust gas emitted from a positive ignition internal combustion engine. In particular, the invention relates to a filter comprising features to reduce or prevent the poisoning of three-way catalyst activity from catalyst poisons present in engine fuel and/or engine lubricant.

BACKGROUND OF THE INVENTION

Positive ignition engines cause combustion of a hydrocarbon and air mixture using spark ignition. Contrastingly, compression ignition engines cause combustion of a hydrocarbon by injecting the hydrocarbon into compressed air. Positive ignition engines can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

TWCs are intended to catalyse three simultaneous reactions: (i) oxidation of carbon monoxide to carbon dioxide, (ii) oxidation of unburned hydrocarbons to carbon dioxide and water; and (iii) reduction of nitrogen oxides to nitrogen and oxygen. These three reactions occur most efficiently when the TWC receives exhaust gas from an engine running at or about the stoichiometric point. As is well known in the art, the quantity of carbon monoxide (CO), unburned hydrocarbons (HC) and nitrogen oxides ($NO_x$) emitted when gasoline fuel is combusted in a positive ignition (e.g. spark-ignited) internal combustion engine is influenced predominantly by the air-to-fuel ratio in the combustion cylinder. An exhaust gas having a stoichiometrically balanced composition is one in which the concentrations of oxidising gases ($NO_x$ and $O_2$) and reducing gases (HC and CO) are substantially matched. The air-to-fuel ratio that produces this stoichiometrically balanced exhaust gas composition is typically given as 14.7:1.

Theoretically, it should be possible to achieve complete conversion of $O_2$, $NO_x$, CO and HC in a stoichiometrically balanced exhaust gas composition to $CO_2$, $H_2O$ and $N_2$ (and residual $O_2$) and this is the duty of the TWC. For this purpose a three-way catalyst (TWC) typically contains one or more platinum group metals, particularly those selected from the group consisting of platinum, palladium and rhodium. Ideally, therefore, the engine should be operated in such a way that the air-to-fuel ratio of the combustion mixture produces the stoichiometrically balanced exhaust gas composition.

A way of defining the compositional balance between oxidising gases and reducing gases of the exhaust gas is the lambda ($\lambda$) value of the exhaust gas, which can be defined according to equation (1) as:

Actual engine air-to-fuel ratio/Stoichiometric engine air-to-fuel ratio, (1)

wherein a lambda value of 1 represents a stoichiometrically balanced (or stoichiometric) exhaust gas composition, wherein a lambda value of >1 represents an excess of $O_2$ and $NO_x$ and the composition is described as "lean" and wherein a lambda value of <1 represents an excess of HC and CO and the composition is described as "rich". It is also common in the art to refer to the air-to-fuel ratio at which the engine operates as "stoichiometric", "lean" or "rich", depending on the exhaust gas composition which the air-to-fuel ratio generates: hence stoichiometrically-operated gasoline engine or lean-burn gasoline engine.

It should be appreciated that the reduction of $NO_x$ to $N_2$ using a TWC is less efficient when the exhaust gas composition is lean of stoichiometric. Equally, the TWC is less able to oxidise CO and HC when the exhaust gas composition is rich. The challenge, therefore, is to maintain the composition of the exhaust gas flowing into the TWC at as close to the stoichiometric composition as possible.

Of course, when the engine is in steady state it is relatively easy to ensure that the air-to-fuel ratio is stoichiometric. However, when the engine is used to propel a vehicle, the quantity of fuel required changes transiently depending upon the load demand placed on the engine by the driver. This makes controlling the air-to-fuel ratio so that a stoichiometric exhaust gas is generated for three-way conversion particularly difficult. In practice, the air-to-fuel ratio is controlled by an engine control unit, which receives information about the exhaust gas composition from an exhaust gas oxygen (EGO) (or lambda) sensor: a so-called closed loop feedback system. A feature of such a system is that the air-to-fuel ratio oscillates (or perturbates) between slightly rich of the stoichiometric (or control set) point and slightly lean, because there is a time lag associated with adjusting air-to-fuel ratio. This perturbation is characterised by the amplitude of the air-to-fuel ratio and the response frequency (Hz).

The active components in a typical TWC comprise one or both of platinum and palladium in combination with rhodium, or even palladium only (no rhodium), supported on a high surface area oxide, and an oxygen storage component.

When the exhaust gas composition is slightly rich of the set point, there is a need for a small amount of oxygen to consume the unreacted CO and HC. i.e. to make the reaction more stoichiometric. Conversely, when the exhaust gas goes slightly lean, the excess oxygen needs to be consumed. This was achieved by the development of the oxygen storage component that liberates or absorbs oxygen during the perturbations. The most commonly used oxygen storage component (OSC) in modern TWCs is cerium oxide ($CeO_2$) or a mixed oxide containing cerium, e.g. a Ce/Zr mixed oxide.

Ambient PM is divided by most authors into the following categories based on their aerodynamic diameter (the aerodynamic diameter is defined as the diameter of a 1 $g/cm^3$ density sphere of the same settling velocity in air as the measured particle):

(i) PM-10—particles of an aerodynamic diameter of less than 10 µm;
(ii) Fine particles of diameters below 2.5 µm (PM-2.5);
(iii) Ultrafine particles of diameters below 0.1 µm (or 100 nm); and
(iv) Nanoparticles, characterised by diameters of less than 50 nm.

Since the mid-1990's, particle size distributions of particulates exhausted from internal combustion engines have received increasing attention due to possible adverse health effects of fine and ultrafine particles. Concentrations of PM-10 particulates in ambient air are regulated by law in the USA. A new, additional ambient air quality standard for PM-2.5 was introduced in the USA in 1997 as a result of health studies that indicated a strong correlation between human mortality and the concentration of fine particles below 2.5 µm.

Interest has now shifted towards nanoparticles generated by diesel and gasoline engines because they are understood to penetrate more deeply into human lungs than particulates of greater size and consequently they are believed to be more harmful than larger particles, extrapolated from the findings of studies into particulates in the 2.5-10.0 µm range.

Size distributions of diesel particulates have a well-established bimodal character that correspond to the particle nucleation and agglomeration mechanisms, with the corresponding particle types referred to as the nuclei mode and the accumulation mode respectively (see FIG. 1). As can be seen from FIG. 1, in the nuclei mode, diesel PM is composed of numerous small particles holding very little mass. Nearly all diesel particulates have sizes of significantly less than 1 µm, i.e. they comprise a mixture of fine, i.e. falling under the 1997 US law, ultrafine and nanoparticles.

Nuclei mode particles are believed to be composed mostly of volatile condensates (hydrocarbons, sulfuric acid, nitric acid etc.) and contain little solid material, such as ash and carbon. Accumulation mode particles are understood to comprise solids (carbon, metallic ash etc.) intermixed with condensates and adsorbed material (heavy hydrocarbons, sulfur species, nitrogen oxide derivatives etc.) Coarse mode particles are not believed to be generated in the diesel combustion process and may be formed through mechanisms such as deposition and subsequent re-entrainment of particulate material from the walls of an engine cylinder, exhaust system, or the particulate sampling system. The relationship between these modes is shown in FIG. 1.

The composition of nucleating particles may change with engine operating conditions, environmental condition (particularly temperature and humidity), dilution and sampling system conditions. Laboratory work and theory have shown that most of the nuclei mode formation and growth occur in the low dilution ratio range. In this range, gas to particle conversion of volatile particle precursors, like heavy hydrocarbons and sulfuric acid, leads to simultaneous nucleation and growth of the nuclei mode and adsorption onto existing particles in the accumulation mode. Laboratory tests (see e.g. SAE 980525 and SAE 2001-01-0201) have shown that nuclei mode formation increases strongly with decreasing air dilution temperature but there is conflicting evidence on whether humidity has an influence.

Generally, low temperature, low dilution ratios, high humidity and long residence times favour nanoparticles formation and growth. Studies have shown that nanoparticles consist mainly of volatile material like heavy hydrocarbons and sulfuric acid with evidence of solid fraction only at very high loads.

Contrastingly, engine-out size distributions of gasoline particulates in steady state operation show a unimodal distribution with a peak of about 60-80 nm (see e.g. FIG. 4 in SAE 1999-01-3530). By comparison with diesel size distribution, gasoline PM is predominantly ultrafine with negligible accumulation and coarse mode.

Particulate collection of diesel particulates in a diesel particulate filter is based on the principle of separating gas-borne particulates from the gas phase using a porous barrier. Diesel filters can be defined as deep-bed filters and/or surface-type filters. In deep-bed filters, the mean pore size of filter media is bigger than the mean diameter of collected particles. The particles are deposited on the media through a combination of depth filtration mechanisms, including diffusional deposition (Brownian motion), inertial deposition (impaction) and flow-line interception (Brownian motion or inertia).

In surface-type filters, the pore diameter of the filter media is less than the diameter of the PM, so PM is separated by sieving. Separation is done by a build-up of collected diesel PM itself, which build-up is commonly referred to as "filtration cake" and the process as "cake filtration".

It is understood that diesel particulate filters, such as ceramic wallflow monoliths, may work through a combination of depth and surface filtration: a filtration cake develops at higher soot loads when the depth filtration capacity is saturated and a particulate layer starts covering the filtration surface. Depth filtration is characterized by somewhat lower filtration efficiency and lower pressure drop than the cake filtration.

Other techniques suggested in the art for separating gasoline PM from the gas phase include vortex recovery.

Emission legislation in Europe from 1 Sep. 2014 (Euro 6) requires control of the number of particles emitted from both diesel and gasoline (positive ignition) passenger cars. For gasoline EU light duty vehicles the allowable limits are: 1000 mg/km carbon monoxide; 60 mg/km nitrogen oxides ($NO_x$); 100 mg/km total hydrocarbons (of which ≤68 mg/km are non-methane hydrocarbons); and 4.5 mg/km particulate matter ((PM) for direct injection engines only). The Euro 6 PM standard will be phased in over a number of years with the standard from the beginning of 2014 being set at $6.0\times10^{12}$ per km (Euro 6) and the standard set from the beginning of 2017 being $6.0\times10^{11}$ per km (Euro 6+). In a practical sense, the range of particulates that are legislated for are between 23 nm and 3 µm.

In the United States, on 22 Mar. 2012, the State of California Air Resources Board (CARB) adopted new Exhaust Standards from 2017 and subsequent model year "LEV III" passenger cars, light-duty trucks and medium-duty vehicles which include a 3 mg/mile emission limit, with a later introduction of 1 mg/mi possible, as long as various interim reviews deem it feasible.

The new Euro 6 (Euro 6 and Euro 6+) emission standard presents a number of challenging design problems for meeting gasoline emission standards. In particular, how to design a filter, or an exhaust system including a filter, for reducing the number of PM gasoline (positive ignition) emissions, yet at the same time meeting the emission standards for non-PM pollutants such as one or more of oxides of nitrogen ($NO_x$), carbon monoxide (CO) and unburned hydrocarbons (HC), all at an acceptable back pressure, e.g. as measured by maximum on-cycle backpressure on the EU drive cycle.

It is envisaged that a minimum of particle reduction for a three-way catalysed particulate filter to meet the Euro 6 PM number standard relative to an equivalent flowthrough catalyst is ≥50%. Additionally, while some backpressure increase for a three-way catalysed wallflow filter relative to an equivalent flowthrough catalyst is inevitable, in our experience peak backpressure over the MVEG-B drive cycle (average over three tests from "fresh") for a majority of passenger vehicles should be limited to <200 mbar, such as <180 mbar, <150 mbar and preferably <120 mbar e.g. <100 mbar.

There have been a number of recent efforts to combine TWCs with filters for meeting the Euro 6 emission standards.

US 2009/0193796 discloses a zoned oxidation catalyst disposed on a soot filter, wherein an inlet zone of 50% of the total axial length of the soot filter is coated with an inlet coat comprising platinum and palladium at a metal loading of 60 $gft^{-3}$ supported on lanthanum-stabilised high surface area gamma alumina, a ceria-zirconia composite and zirconium oxide at a washcoat loading of 0.64 $gin^{-3}$; and an outlet zone of 50% of the total axial length of the soot filter is coated with an outlet coat also comprising platinum and palladium at a metal loading of 15 gft$^{-3}$ supported on lanthanum-stabilised high surface area gamma alumina, a ceria-zirconia composite and zirconium oxide at a washcoat loading of 0.61 gin$^{-3}$. The total precious metal loading in the soot filter was 37.5 gft$_{-3}$ and the Pt/Pd/Rh ratio was 25/12.5/0.

Catalysts for vehicular exhaust gas aftertreatment, such as three-way catalysts for simultaneously converting carbon monoxide, unburned hydrocarbons and oxides of nitrogen in exhaust gas emitted from a positive ignition internal combustion engine, can become deactivated through use. A primary cause of deactivation results from contamination (poisoning) by contaminants present in the feed gas.

There are two basic mechanisms where catalysts for treating exhaust gas from internal combustion engines can become poisoned: (i) selective poisoning, in which a contaminant reacts directly with an active site or catalyst support causing a reduction in activity or a catastrophic loss in activity; and (ii) non-selective poisoning, which causes a loss of performance by sterically hindering access to active sites or pores in a catalyst support by fouling (or masking) a surface of the support or active sites. An example of mechanism (ii) is the deposition of ash derived from the combustion of lubricant oil and fuel additives or coking by hydrocarbons. Build-up of ash derived e.g. from fuel additives can contribute to an increase in back pressure in the system and an increase in fuel consumption. From his experience, the inventor found that manganese, zinc, calcium and (at low temperature) phosphorus (as phosphoric acid droplets) and oil droplets as such (all derived from the fuel or lubricants) are non-selective poisons. Poisons which chemically react with catalyst components (mechanism (i)) include lead and sulphur oxides (by chemisorption) and (at higher temperature) phosphorus. A review of poisons and poisoning mechanisms can be found, for example, in A. J. J. Wilkins et al., Platinum Metals Review, 1990, 34(1) 16-24.

It is understood that ash which causes non-selective poisoning is introduced into diesel filters in combination with soot particles, which naturally collect towards the rear of the filter. The inventor noticed that where a three-way catalyst is coated on a flowthrough honeycomb substrate, poisons residues are concentrated close to the inlet, because they are primarily transported in droplets (e.g. oil, phosphoric acid) which decompose quickly when in first contact with the washcoat surface, depositing an inorganic residue. Very surprisingly, the inventor found that where the three-way catalyst is coated on a wall-flow filter substrate, a majority of poisoning occurs in a similar way to that seen on a TWC coated on a flowthrough honeycomb substrate, rather than poison transport in dry soot/ash, as is seen in diesel filters.

From this observation, the inventor had the idea to coat the inlet end of filters such as wallflow filters with a washcoat that preferentially traps catalyst poisons in order to protect catalyst washcoat further downstream in the filter, e.g. further downstream in the inlet channels of a wallflow filter and in the outlet channels.

The current Euro stage 5 emission standard requires a vehicle in-service conformity of 100,000 km or 5 years with durability testing of pollution control devices for type approval of 160,000 km or 5 years (whichever occurs first). In lieu of a durability test, manufacturers may use the following deterioration factors: Positive ignition engines: 1.5 for CO; 1.3 for HC; 1.6 for NOx; 1.0 for PM and PN; and for compression ignition, Euro 5: 1.5 for CO; 1.1 for NOx and HC+NOx; 1.0 for PM and PN. The deterioration factors for the future Euro 6 stage has yet to be determined.

Therefore there is a need in this technical field to reduce or prevent deterioration in performance of catalysed filter exhaust gas aftertreatment devices for positive ignition engines and increases in backpressure in an exhaust system for positive ignition engines that includes a filter via known modes of catalyst poisoning and fouling. The present invention is aimed at such need.

The invention proposes a solution to this need which is the application of a high washcoat loading/high specific surface area coating to an inlet zone of a filter, to preferentially trap incoming oil and other residues transported in droplets thereby to minimise poisons/ash build up on the remainder of the unit, thus maintaining catalyst activity to meet in-service conformity but minimising backpressure increase over the filter lifetime. An advantage of minimising washcoat permeability at the filter inlet (to trap poisons) is that there is less impact on backpressure than if reduced washcoat permeability were disposed toward the downstream end of the filter.

SUMMARY OF THE INVENTION

The invention is a catalysed filter for filtering particulate matter from exhaust gas comprising one or more catalyst poisons and emitted from a positive ignition internal combustion engine. The filter comprises a porous substrate having a total substrate length and having inlet surfaces and outlet surfaces. The inlet surfaces are separated from the outlet surfaces by a porous structure containing pores of a first mean pore size. The porous substrate is coated with a washcoat comprising a plurality of solid particles, wherein the porous structure of the washcoated porous substrate contains pores of a second mean pore size. The second mean pore size is less than the first mean pore size. The washcoat is axially arranged on the porous substrate as a first zone comprising the inlet surfaces of a first substrate length less than the total substrate length and a second zone comprising the outlet surfaces of a second substrate length less than the total substrate length. The sum of the substrate length in the first zone and the substrate length in the second zone≥100%, wherein the washcoat of at least the second zone is a three-way catalyst washcoat comprising one or more precious metal supported on a high surface area oxide, and an oxygen storage component and wherein a specific surface area of washcoat in the first zone>second zone; or both a washcoat loading and a specific surface area of washcoat in the first zone>second zone.

DETAILED DESCRIPTION OF THE INVENTION

Figure 1:
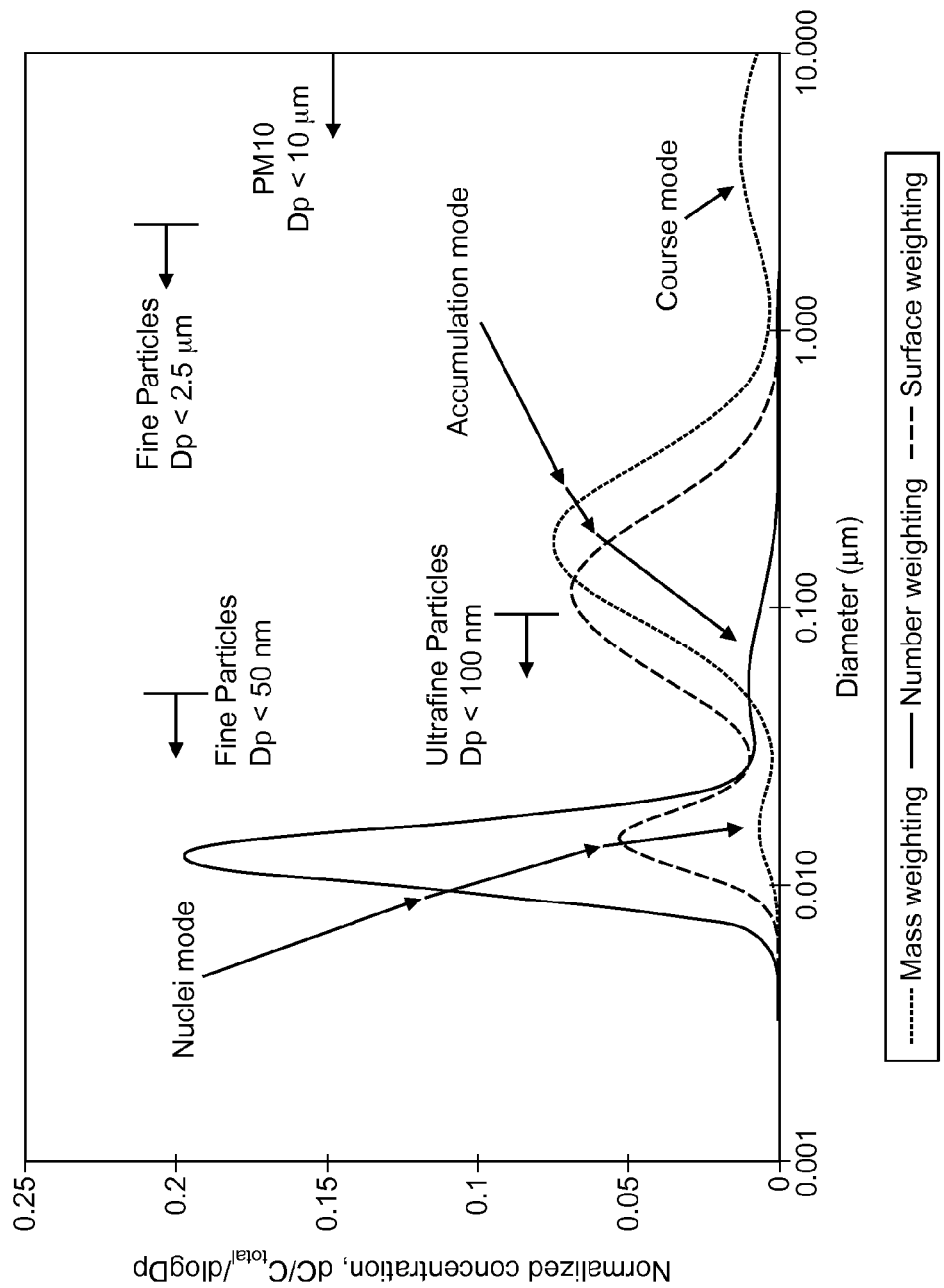
FIG. 1 is a graph showing the size distributions of PM in the exhaust gas of a diesel engine.

According to a first aspect, the invention provides a catalysed filter for filtering particulate matter from exhaust gas comprising one or more catalyst poisons and emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a washcoat comprising a plurality of solid particles, wherein the porous structure of the washcoated porous substrate contains pores of a second mean pore size, wherein the second mean pore size is less than the first mean pore size, which washcoat being axially arranged on the porous substrate as a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone≥100%, wherein the washcoat of at least the second zone is a three-way catalyst washcoat comprising one or more precious metal supported on a high surface area base metal oxide, and an oxygen storage component and wherein:

(i) a specific surface area of washcoat in the first zone>second zone; or (ii) both a washcoat loading and a specific surface area of washcoat in the first zone>second zone.

"Specific surface area" or "SSA" as defined herein has its ordinary meaning, i.e. the property of a solid which is the total surface area of a material per unit of mass, solid or bulk volume, or cross-sectional area. It can be measured by the well-known BET or Brunauer, Emmett and Teller method (S. Brunauer, P. H. Emmett and E. Teller, J. Am. Chem. Soc., 1938, 60, 309) by physical adsorption of gas molecules, e.g. nitrogen or water vapour, on a solid surface. Specific surface area is different from "surface area" per se, because specific surface area includes a dimension of mass e.g. $m^2/g$, whereas the dimensions of surface area do not include mass, just an area dimension, e.g. $m^2$. So, for example, 1 g of a certain washcoat coated on a honeycomb substrate "X" having certain dimensions will have a lower surface area (i.e. surface area as such) than 2 g of that washcoat on an identical honeycomb substrate, yet the specific surface area of the washcoat would be the same. The same applies if the 1 g of the certain washcoat is coated onto a honeycomb substrate which is twice as long as honeycomb substrate "X". That is, to have a higher specific surface area according to the first aspect of the invention, the washcoat in the first zone must be different from the washcoat in the second zone.

The higher specific surface area of washcoat in the first zone relative to the second zone can be provided by one or more of optionally stabilised alumina, silica, titania, ceria, optionally doped ceria-zirconia composite oxides, optionally doped ceria-zirconia mixed oxides and zeolites. Alumina stabilisers can be lanthanum, yttrium, cerium, barium, strontium and praseodymium, with lanthanum stabilised alumina being preferred. Preferred dopants for the ceria-zirconia composite oxides and mixed oxides may be selected from any of those mentioned hereinabove, i.e. lanthanum, praseodymium, yttrium and neodymium.

One component that a skilled person might wish to include in the second zone as well as the first zone is optionally stabilised alumina. However, a component which is not typically included in a three-way catalyst and would therefore not generally be included in the second zone but could be included in the first zone to increase the specific surface area of the first zone is a zeolite.

According to preferred embodiments, the SSA in the first zone is >50 $m^2/g$, more preferably >100 $m^2/g$.

In one embodiment, the washcoat of the first zone is substantially precious metal free. However, in a preferred embodiment, the washcoat of the first zone is also a three-way catalyst washcoat.

In a preferred embodiment, the three-way catalyst washcoat in the first zone comprises two or more populations of solid particles, and wherein one or more of the two or more populations of solid particles (being less than a total of the two or more populations of solid particles) does not support the more than one precious metal. So, for example, the first zone might comprise (i) an optionally doped ceria-zirconia mixed oxide or composite oxide as an oxygen storage component; and (ii) lanthanum stabilised alumina, each of (i) and (ii) supporting the one or more precious metal and (iii) solid particles of one or more of optionally stabilised alumina, silica, titania, ceria, optionally doped ceria-zirconia composite oxides, optionally doped ceria-zirconia mixed oxides and zeolites, which item (iii) does not support the one or more precious metal. This combination can be obtained by pre-fixing the one or more precious metal to items (i) and (ii) prior to combining (i) and (ii) in a washcoat with item (iii). An advantage of this arrangement is that the relatively high specific surface area item (iii) can act as a poison trap whilst reducing or preventing poisoning of activity of the one or more precious metal activity on the item (iii) thereby providing more efficient use of the one or more precious metal in the three-way catalyst and maintaining durability of three-way catalyst activity.

It is a particular feature of the present invention that washcoat loadings used in the first, upstream zone can be higher than the previously regarded highest washcoat loadings, e.g. those disclosed in the Examples in WO 2010/097634. In a particular embodiment, the washcoat loading in the first zone is >1.60 g $in^{-3}$, such as >2.00 g $in^{-3}$, and in preferred embodiments the washcoat loading in the first zone is >2.4 g $in^{-3}$. Preferably the washcoat loading in the first zone is <3.0 g $in^{-3}$.

In the catalysed filter according to the invention, the sum of the substrate length in the first zone and the substrate length in the second zone≥100%, i.e. there is no gap in the axial direction, or there is axial overlap, between the first zone on the inlet surface and the second zone on the outlet surface.

The length of axial overlap between inlet and outlet surface coatings can be >10%, e.g. 10-30%, i.e. the sum of the substrate length in the first zone and the substrate length in the second zone >110%, e.g. 110-130%.

The substrate length in the first zone can be the same as or different from that of the second zone. So, where the first zone length is the same as the second zone length the porous substrate is coated in a ratio of 1:1 between the inlet surface and the outlet surface. However, preferably, the substrate length in the first zone<the substrate length in the second zone. In embodiments, the substrate length in the first zone<the substrate length in the second zone, e.g. <45%. In preferred embodiments, the substrate zone length in the first zone is <40%, e.g. <35% such as <30%, <20%, <10% of the total substrate length.

In a particular embodiment, as discussed hereinabove, the first zone contains no precious metal. However, in preferred embodiments, the total precious metal loading in the first zone<the total precious metal loading in the second zone, to avoid inefficient loss of precious metals through poisoning. In particularly preferred embodiments of the latter arrangement, the total precious metal loading in the first zone is <50 $gft^{-3}$, e.g. <30 $gft^{-3}$ such as <20 $gft^{-3}$. Precious metal loading in the second zone can be >50 $gft^{-3}$, but is preferably between 60-250 $gft^{-3}$, and is typically from 70-150 $gft^{-3}$.

The one or more precious metal of the three-way catalyst washcoat of the second zone and (where present) the first zone can be selected from the group consisting of (i) platinum and rhodium; (ii) palladium and rhodium; (iii) platinum, palladium and rhodium; (iv) palladium only; and (v) rhodium only.

The filter according to the invention comprises at least one base metal oxide as a support for the one or more precious metal. In embodiments, the at least one base metal oxide comprises optionally stabilised alumina, zirconia, silica, titania, silica-alumina, magnesium oxide, hafnium oxide, lanthanum oxide, yttrium oxide and combinations of any two or more thereof.

Most preferably, the at least one base metal comprises optionally stabilised (gamma) alumina.

Suitable alumina stabilisers include lanthanum, yttrium, cerium, barium, strontium and praseodymium, preferably lanthanum.

The oxygen storage component may also act as a support for the one or more precious metal. Preferably, the oxygen storage component of the three-way catalyst washcoat is a mixed oxide or composite oxide comprising cerium. Most preferably, the mixed oxide or composite oxide comprising cerium comprises zirconium. In one embodiment, a proportion of cerium oxide present in the mixed oxide or composite oxide comprising cerium oxide and zirconium oxide is from 20 wt % to 60 wt %, preferably from 20 wt % to 40 wt %, most preferably from 25 to 35 wt %. That is, the mixed oxide consists of oxides of cerium and zirconium. A proportion of zirconium oxide present in the mixed oxide or composite oxide comprising cerium oxide and zirconium oxide can be from 40 wt % to 80 wt %. It is preferred to include more zirconium oxide than cerium oxide in the mixed oxide or composite oxide comprising cerium oxide and zirconium oxide because the resulting combination has been found to have kinetically faster oxygen storage activity, wherein oxygen is either adsorbed from exhaust gas slightly lean of stoichiometric or is released in contact with exhaust gas slightly rich of stoichiometric.

The mixed oxide or composite oxide comprising cerium can be formed by techniques such as co-gelling, co-precipitation, plasma spraying, flame spray pyrolysis and the like. Any other suitable technique for preparing the mixed oxide comprising cerium can be used provided that the resultant product contains the cerium and one or more additional non-cerium elements dispersed throughout the matrix of the particle in the finished product. Such techniques are distinguished from those that merely disperse e.g. zirconia on the surface of ceria particles or only within a surface layer, thereby leaving a substantial core of the ceria particle without zirconia dispersed therein. Suitable techniques for forming co-precipitated ceria-zirconia composites are disclosed in U.S. Pat. Nos. 5,057,483 and 5,898,014.

Cerium and zirconium salts are also useful for forming the preferred mixed oxides and composite oxides comprising cerium and zirconium including cerium and zirconium chlorides, sulfates, nitrates, acetates, etc. Where the mixed oxides or the composite oxides are formed by a co-precipitation technique, the intermediate co-precipitates can, after washing, be spray dried or freeze dried to remove the water and then calcined in air at about 500° C. to form the end products.

In one embodiment according to the invention, the mixed oxide or composite oxide comprising cerium and zirconium, the mixed oxide or composite oxide comprises no rare earth elements other than cerium. However, according to a highly preferred embodiment, the mixed oxide or composite oxide comprising cerium and zirconium comprises oxides of one or more rare earth metal elements other than cerium. In such preferred embodiments, the one or more rare earth metal elements other than cerium can be selected from the group consisting of lanthanum, praseodymium, yttrium and neodymium. Oxides of the rare earth metal elements other than cerium can form from 0.1 to 20 wt % of the mixed oxide or composite oxide comprising cerium oxide and zirconium oxide, such as from 2.5 wt % to 10 wt %, e.g. 3 wt % to 7 wt %, wherein a proportion of zirconium oxide present in the mixed oxide or composite oxide comprising cerium oxide and zirconium oxide can be from 50 wt % to 80 wt %. Preferably, a proportion of zirconium oxide present is greater than a proportion of cerium oxide present in the mixed oxide or composite oxide comprising cerium oxide, zirconium oxide and oxides of one or more one or more rare earth metal elements other than cerium.

A preferred mixed oxide or composite oxide for use in the present invention contains neodymium in addition to ceria and zirconia. Such a mixed oxide or composite oxide can lower the temperatures at which the particulate, and in particular the soot fraction, combusts. Therefore, the incorporation of these mixed oxides or composite oxides containing neodymia can be beneficial in regenerating soot filters containing deposited particulate. While not wishing to be bound by any particular theory, it is believed that the neodymia contributes to the enhanced catalytic effect of the mixed oxides or composite oxides due to the relative ease with which neodymia transfers activated oxygen to the trapped carbonaceous component that comprises the soot fraction, over other rare earth metal oxides.

As described above, preferred mixed oxides and composite oxides of ceria-zirconia that contain neodymia are preferably formed by techniques such as co-gelling and co-precipitation of soluble salts of mixtures of cerium, neodymium and zirconium. It is preferred that all three components are mixed by the above-mentioned techniques so that all three components are dispersed uniformly throughout the composite matrix; however, it is also possible but less preferable to impregnate a ceria-zirconia mixed oxide or composite oxide with a solution of a soluble salt of neodymium, e.g., neodymium nitrate, to load the neodymium component. Impregnation of a preformed ceria-zirconia mixed oxide or composite oxide is disclosed in U.S. Pat. No. 6,423,293.

Solid (or "bulk") particles referred to herein are to be distinguished from dispersions. As used herein the term "bulk" to refer to base metal oxides such as alumina (or any other component) means that the alumina is present as solid particles thereof. These particles are usually very fine, of the order of at least 90 percent of the particles (i.e. D90) being from about 0.5 to 15 microns in diameter. The term "bulk" is intended to distinguish from the situation in which alumina is "dispersed" on a refractory support material e.g. by being impregnated into the support material from a solution or some other liquid dispersion of the component and then dried and calcined to convert the impregnated aluminium salt to a dispersion of alumina particles on a surface of the refractory support. The resultant alumina is thus "dispersed" onto and, to a greater or lesser extent, within a surface layer of the refractory support. The dispersed alumina is not present in bulk form, because bulk alumina comprises fine, solid particles of alumina. The dispersion can also take the form of a sol, i.e. finely divided particles of e.g. alumina on the nanometer scale. That is, the mixed oxide or composite oxide comprising cerium has a median particle size less than 1 μm is not a "bulk" material.

In preferred embodiments, the first and second zones comprise a surface washcoat, wherein a washcoat layer substantially covers surface pores of the porous structure and the pores of the washcoated porous substrate are defined in part by spaces between the particles (interparticle pores) in the washcoat. Methods of making surface coated porous filter substrates include introducing a polymer, e.g. polyvinyl alcohol (PVA), into the porous structure, applying a washcoat to the porous filter substrate including the polymer and drying, then calcining the coated substrate to burn out the polymer.

In this preferred embodiment, an average interparticle pore size of the porous washcoat is 5.0 nm to 5.0 µm, such as 0.1-1.0 µm.

As explained hereinabove, TWC composition generally comprises one or both of platinum and palladium in combination with rhodium, or even palladium only (no rhodium), supported on a high surface area oxide, e.g. gamma alumina, and an oxygen storage component, e.g. comprising a mixed oxide comprising cerium. In embodiments, the mean size (D50) of the solid washcoat particles is in the range 1 to 40 µm. In practice, the oxygen storage components may have a different particle size from the high surface area oxide. So, an OSC may have a D50 between 1-10 µm, such as from 4 and 6 µm; and a high surface area oxide may have a D50 of between 1-10 µm, such as from 4 and 6 µm.

For the avoidance of doubt, the D50 and D90 values defined herein are intended to be obtained by laser diffraction particle size analysis. The D50 and D90 figures presented in the Examples were also obtained using laser diffraction particle size analysis.

In further embodiments, the D90 of solid washcoat particles is in the range of from 0.1 to 20 µm. Again, the D90 of the OSC may be different from that of the high surface area oxide. So, the D90 of the OSC can be <18 µm and the D90 of the high surface area oxide can be <20 µm.

Mean pore size can be determined by mercury porosimetry.

Methods of coating porous filter substrates are known to the skilled person and include, without limitation, the method disclosed in WO 99/47260, i.e. a method of coating a monolithic support, comprising the steps of (a) locating a containment means on top of a support, (b) dosing a pre-determined quantity of a liquid component into said containment means, either in the order (a) then (b) or (b) then (a), and (c) by applying pressure or vacuum, drawing said liquid component into at least a portion of the support, and retaining substantially all of said quantity within the support. Such process steps can be repeated from another end of the monolithic support following drying of the first coating with optional firing/calcination.

Alternatively, the method disclosed in WO 2011/080525 can be used, i.e. comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

In an alternative embodiment, at least part of the washcoat sits substantially within, i.e. permeates, the porous structure of the porous substrate. Methods of making a filter according to this particular embodiment include the appropriate formulation of the washcoat known to the person skilled in the art including particulate size adjustment, e.g. through milling, viscosity adjustment, selection of low wetting characteristics and application of an appropriate vacuum following washcoating of the porous substrate (see also WO 99/47260).

In the latter embodiment, wherein at least part of the washcoat is in the porous structure, a size, e.g. a mean size, of the solid washcoat particles can be less than the mean pore size of the porous filter substrate for example in the range 0.1 to 20 µm, such as 1 to 18 µm, 1 to 16 µm, 2 to 15 µm or 3 to 12 µm. In particular embodiments, the abovementioned size of the solid washcoat particles is a D90 instead of a mean size.

The porous substrate is preferably a monolith substrate and can be a metal, such as a sintered metal, or a ceramic, e.g. silicon carbide, cordierite, aluminium nitride, silicon nitride, aluminium titanate, alumina, mullite e.g., acicular mullite (see e.g. WO 01/16050), pollucite, a thermet such as $Al_2O_3$/Fe, $Al_2O_3$/Ni or $B_4C$/Fe, or composites comprising segments of any two or more thereof. In a preferred embodiment, the filter is a wallflow filter comprising a ceramic porous filter substrate, preferably silicon carbide, cordierite or aluminium titanate having a plurality of inlet channels and a plurality of outlet channels, wherein each inlet channel and each outlet channel is defined in part by a ceramic wall of porous structure, wherein each inlet channel is separated from an outlet channel by a ceramic wall of porous structure. This filter arrangement is also disclosed in SAE 810114, and reference can be made to this document for further details. Alternatively, the filter can be a foam, or a so-called partial filter, such as those disclosed in EP 1057519 or WO 01/080978.

In a highly preferred embodiment, the filter is a wallflow filter and the first zone comprises the inlet channels of the wallflow filter and the second zone comprises the outlet channels thereof.

The cell density of diesel wallflow filters in practical use can be different from wallflow filters for use in the present invention in that the cell density of diesel wallflow filters is generally 300 cells per square inch (cpsi) or less, e.g. 100 or 200 cpsi, so that the relatively larger diesel PM components can enter inlet channels of the filter without becoming impacted on the solid frontal area of the diesel particulate filter, thereby caking and fouling access to the open channels, whereas wallflow filters for use in the present invention can be up to 300 cpsi or greater, such as 350 cpsi, 400, cpsi, 600 cpsi, 900 cpsi or even 1200 cpsi.

An advantage of using higher cell densities is that the filter can have a reduced cross-section, e.g. diameter, than diesel particulate filters, which is a useful practical advantage that increases design options for locating exhaust systems on a vehicle.

It will be understood that the benefit of filters for use in the invention is substantially independent of the porosity of the uncoated porous substrate. Porosity is a measure of the percentage of void space in a porous substrate and is related to backpressure in an exhaust system: generally, the lower the porosity, the higher the backpressure. However, the porosity of filters for use in the present invention are typically >40% or >50% and porosities of 45-75% such as 50-65% or 55-60% can be used with advantage. The mean pore size of the washcoated porous substrate is important for filtration. So, it is possible to have a porous substrate of relatively high porosity that is a poor filter because the mean pore size is also relatively high.

In embodiments, the first mean pore size e.g. of surface pores of the porous structure of the porous filter substrate is from 8 to 45 µm, for example 8 to 25 µm, 10 to 20 µm or 10 to 15 µm. In particular embodiments, the first mean pore size is >18 µm such as from 15 to 45 µm, 20 to 45 µm e.g. 20 to 30 µm, or 25 to 45 µm.

According to a second aspect, the present invention provides an exhaust system for a positive ignition internal combustion engine comprising a catalysed filter according to the first aspect of the present invention, wherein the first zone is disposed upstream of the second zone.

In a preferred embodiment, the exhaust system comprises a flow through monolith substrate comprising a three-way catalyst composition disposed upstream of the catalysed filter.

The filter according to the invention could obviously be used in combination with other exhaust system aftertreatment components to provide a full exhaust system aftertreatment apparatus, e.g. a low thermal mass TWC upstream of the filter and/or downstream catalytic elements, e.g. $NO_x$ trap or SCR catalyst, according to specific requirements. So, in vehicular positive ignition applications producing relatively cool on-drive cycle exhaust gas temperatures, we contemplate using a low thermal mass TWC disposed upstream of the filter according to the invention. For vehicular lean-burn positive ignition applications, we envisage using a filter according to the invention upstream or downstream of a $NO_x$ trap. In vehicular stoichiometrically-operated positive ignition engines, we believe that the filter according to the present invention can be used as a standalone catalytic exhaust system aftertreatment component. That is, in certain applications the filter according to the present invention is adjacent and in direct fluid communication with the engine without intervening catalysts therebetween; and/or an exit to atmosphere from an exhaust gas aftertreatment system is adjacent to and in direct fluid communication with the filter according to the present invention without intervening catalysts therebetween.

An additional requirement of a TWC is a need to provide a diagnosis function for its useful life, so called "on-board diagnostics" or OBD. A problem in OBD arises where there is insufficient oxygen storage capacity in the TWC, because OBD processes for TWCs use remaining oxygen storage capacity to diagnose remaining catalyst function. However, if insufficient washcoat is loaded on the filter such as in the specific Examples disclosed in US 2009/0193796 and WO 2009/043390, there may not be enough OSC present to provide an accurate OSC "delta" for OBD purposes. Since the present invention enables washcoat loadings approaching current state-of-the-art TWCs, the filters for use in the present invention can be used with advantage in current OBD processes.

According to a third aspect, the invention provides a positive ignition engine comprising an exhaust system according to the second aspect of the present invention.

Positive ignition internal combustion engines, such as spark ignition internal combustion engines, for use in this aspect of the invention can be fuelled by gasoline fuel, gasoline fuel blended with oxygenates including methanol and/or ethanol, liquid petroleum gas or compressed natural gas. Positive ignition engines can be stoichiometrically operated engines or lean-burn operated engines.

According to a fourth aspect, the invention provides a method of maintaining simultaneous conversion of carbon monoxide, hydrocarbons, oxides of nitrogen and particulate matter in exhaust gas comprising one or more catalyst poison emitted from a positive ignition internal combustion engine using a catalysed filter substrate having a total substrate length and coated with a three-way catalyst washcoat during ageing in use, which method comprising the step of contacting the exhaust gas with the catalysed filter substrate, trapping at least some of the one or more catalyst poison in a first zone comprising inlet surfaces of a first substrate length less than the total substrate length and a second zone comprising outlet surfaces of a second substrate length less than the total substrate length, wherein the sum of the substrate length in the first zone and the substrate length in the second zone≥100%, wherein the washcoat of at least the second zone is a three-way catalyst washcoat comprising one or more precious metal supported on a high surface area base metal oxide, and an oxygen storage component and wherein:

(i) a specific surface area of washcoat in the first zone>second zone; or (ii) both a washcoat loading and a specific surface area of washcoat in the first zone>second zone.

Figure 2:
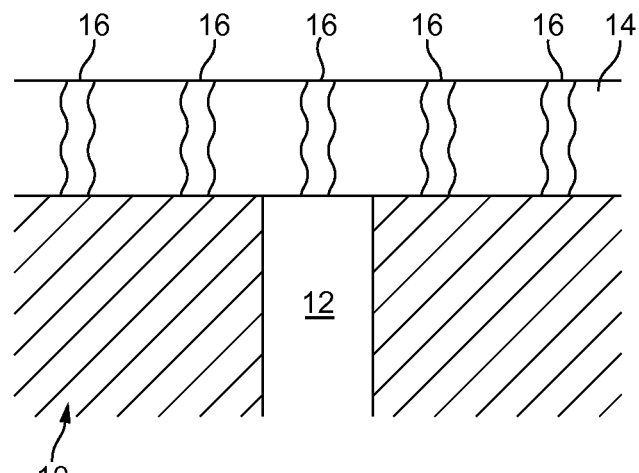
FIG. 2 is a schematic drawing of an embodiment of a washcoated porous filter substrate according to the invention.
Figure 3:
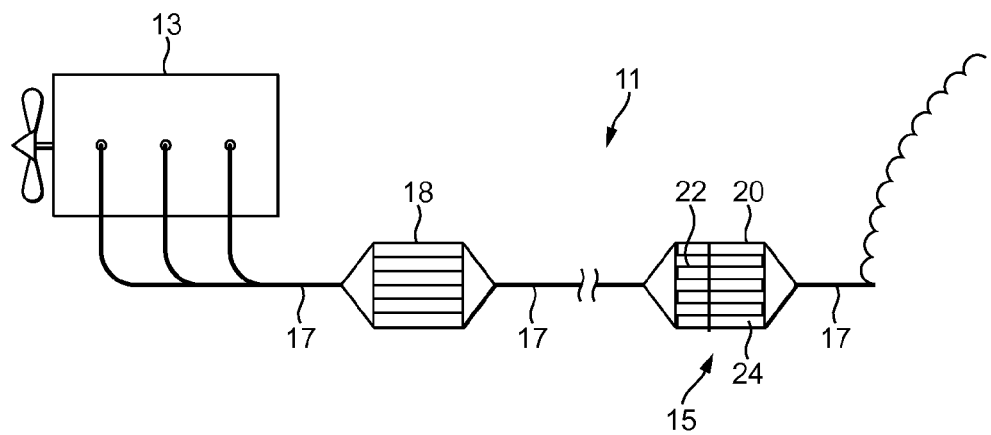
FIG. 3 is a schematic drawing of an embodiment of an exhaust system according to the invention.

In order that the invention may be more fully understood, reference is made to the accompanying drawings wherein:

FIG. 1 is a graph showing the size distributions of PM in the exhaust gas of a diesel engine. For comparison, a gasoline size distribution is shown at FIG. 4 of SAE 1999-01-3530;

FIG. 2 is a schematic drawing of an embodiment of a washcoated porous filter substrate according to the invention; and FIG. 3 is a schematic drawing of an embodiment of an exhaust system according to the invention.

FIG. 2 shows a cross-section through a porous filter substrate 10 comprising a surface pore 12. FIG. 2 shows an embodiment, featuring a porous surface washcoat layer 14 comprised of solid washcoat particles, the spaces between which particles define pores (interparticle pores). It can be seen that the washcoat layer 14 substantially covers the pore 12 of the porous structure and that a mean pore size of the interparticle pores 16 is less than the mean pore size 12 of the porous filter substrate 10.

FIG. 3 shows an apparatus 11 according to the invention comprising a vehicular positive ignition engine 13 and an exhaust system 15 therefor. Exhaust system 15 comprises a conduit 17 linking catalytic aftertreatment components, namely a Pd—Rh-based TWC coated onto an inert cordierite flowthrough substrate 18 disposed close to the exhaust manifold of the engine (the so-called "close coupled" position). Downstream of the "close-coupled" catalyst 18 in turn is a zoned TWC washcoat comprising a doped ceria-zirconia mixed oxide as oxygen storage component and lanthana-stabilised gamma alumina high surface area base metal oxide, both supporting the precious metals Pd and Rh and being coated onto a cordierite wall-flow filter 20 having a total length. The inlet channels are coated with a TWC washcoat to a length of one third of the total length measured from an upstream or inlet end of the wall-flow filter with a washcoat loading of 2.8 gin$^{-3}$ comprising a relatively low precious metal loading of 18 gft$^{-3}$ (16Pd:2Rh) and beta (BEA) zeolite, which coating defining a first zone 22. The beta zeolite is for increasing the specific surface area of the TWC washcoat in the first zone relative to the second zone. In the first zone, the supported Pd/Rh precious metals are pre-fixed to the doped ceria-zirconia mixed oxide and the lanthana-stabilised gamma alumina. The outlet channels are coated with a Pd—Rh-based TWC (no beta zeolite) coated on two thirds of the total length of the wall-flow filter measured from the downstream or outlet end of the wall-flow filter with a washcoat loading of 1.0 gin$^{-3}$ comprising a relatively high precious metal loading of 60 gft$^{-3}$ (16Pd:1Rh), which coating defining a second zone 24.

In order that the invention may be more fully understood the following Examples are provided by way of illustration only.

EXAMPLES

The following Examples are not according to the invention but illustrate the problem of poisoning of inlet coatings in both three-way catalyst compositions coated on flow-through substrates and three-way catalyst compositions coated on honeycomb wall-flow filter substrates, which prompted the inventor to suggest the solution according to the first aspect of the present invention.

Example 1

Preparation of Three-Way Catalysed Flow-Through Substrate and Filter

A cordierite wall-flow (honeycomb) filter of dimensions 118.4×101.6 mm, 300 cells per square inch, wall thickness 12 thousandths of an inch and having a mean pore size of 20 μm and a porosity of 65% was coated homogeneously (i.e. both inlet and outlet channels) with a TWC washcoat composition comprising a precious metal loading of 85 g/ft$^3$ (80Pd:5Rh) to a total washcoat loading of 2.4 g/in$^3$. In each case, the TWC composition was milled to a d90<17 μm) so that the coating when applied would be expected preferentially to locate more at the surface of a wallflow filter wall ("on-wall"). The washcoat loadings quoted were obtained using the method disclosed in WO 2011/080525, i.e. comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

A cordierite flow-through honeycomb monolith substrate of dimensions 118.4×101.6 mm, 600 cells per square inch and a wall thickness 4 thousandths of an inch was coated homogeneously with a TWC washcoat composition comprising a precious metal loading of 20 g/ft$^3$ (18Pd:2Rh) to a total washcoat loading of 3.5 g/in$^3$. The method of coating was that described in WO99/47260.

Example 2

Testing

Fresh TWC-coated flowthrough monolith substrate and fresh TWC-coated filters were engine-aged in an exhaust system of a bench-mounted V8, 4 liter direct injection gasoline engine in one of the configurations set out in Table 1.

TABLE 1

| Catalyst System | Close-Coupled TWC-coated Flowthrough Substrate | TWC-coated Filter location |
|---|---|---|
| 1 | Yes | Close Coupled |
| 2 | Yes | Under Floor |
| 3 | No | Close Coupled |
| 4 | No | Under Floor |

The "Close Coupled" position for the TWC-coated flowthrough substrate was about 80 cm downstream from the exhaust manifold. The "Close Coupled" position of the TWC-coated filter was about 1 cm downstream from the close-coupled TWC-coated flowthrough substrate. The "Under Floor" location of the TWC-coated filter was about 1 meter downstream from the close-coupled TWC-coated flowthrough substrate.

Each system was aged in an accelerated oil poisoning regime by doping the normal unleaded ageing fuel with 100 ppm zinc dialkyl diphosphate (ZDDP) added and calcium sulphonate, to the equivalent oil use of 0.8 liters of oil use per 10,000 km over a 160,000 km/80 hours ageing under lean spike ageing conditions, i.e. a consumption of 12.8 liters of oil.

Following ageing, each 118.4 mm-long part was split lengthwise into one of four equal lengths labelled A-D inclusive (length "A" being the inlet, length "D" being the outlet) and poison analysis for calcium, zinc, sulphur and phosphorus ("post mortem") was carried out by the X-Ray Fluorescence technique. The results of for each system are shown in Tables 2 (1-4).

TABLE 2(1)

| System 1 | | | | | | | | |
|---|---|---|---|---|---|---|---|---|
| | Close-Coupled TWC-coated flowthrough substrate (Poison present (wt %)) | | | | Close-Coupled TWC-coated filter (Poison present (wt %)) | | | |
| System 1 | A | B | C | D | A | B | C | D |
| Ca | 0.10 | 0.03 | 0.01 | 0.00 | 0.04 | 0.02 | 0.05 | 0.09 |
| Zn | 0.41 | 0.15 | 0.07 | 0.04 | 0.03 | 0.02 | 0.02 | 0.04 |
| S | 0.00 | 0.00 | 0.00 | 0.00 | 0.05 | 0.04 | 0.04 | 0.04 |
| P | 1.15 | 0.43 | 0.19 | 0.10 | 0.11 | 0.07 | 0.12 | 0.18 |

TABLE 2(2)

| System 2 | | | | | | | | |
|---|---|---|---|---|---|---|---|---|
| | Close-Coupled TWC-coated flowthrough substrate (Poison present (wt %)) | | | | Under-Floor TWC-coated filter (Poison present (wt %)) | | | |
| System 2 | A | B | C | D | A | B | C | D |
| Ca | 0.09 | 0.03 | 0.01 | 0.00 | 0.03 | 0.02 | 0.06 | 0.22 |
| Zn | 0.41 | 0.16 | 0.08 | 0.04 | 0.02 | 0.02 | 0.02 | 0.09 |
| S | 0.00 | 0.00 | 0.00 | 0.00 | 0.02 | 0.02 | 0.01 | 0.02 |
| P | 1.08 | 0.45 | 0.20 | 0.11 | 0.10 | 0.07 | 0.14 | 0.44 |

TABLE 2(3)

| System 3 | | | | | | | | |
|---|---|---|---|---|---|---|---|---|
| | Close-Coupled TWC-coated flowthrough substrate (Poison present (wt %)) | | | | Close-Coupled TWC-coated filter (Poison present (wt %)) | | | |
| System 3 | A | B | C | D | A | B | C | D |
| Ca | N/A | N/A | N/A | N/A | 0.17 | 0.09 | 0.14 | 0.29 |
| Zn | N/A | N/A | N/A | N/A | 0.42 | 0.25 | 0.17 | 0.18 |
| S | N/A | N/A | N/A | N/A | 0.01 | 0.01 | 0.01 | 0.01 |
| P | N/A | N/A | N/A | N/A | 0.96 | 0.66 | 0.55 | 0.73 |

TABLE 2(4)

| System 4 | | | | | | | | |
|---|---|---|---|---|---|---|---|---|
| | Close-Coupled TWC-coated flowthrough substrate (Poison present (wt %)) | | | | Under-Floor TWC-coated filter (Poison present (wt %)) | | | |
| System 4 | A | B | C | D | A | B | C | D |
| Ca | N/A | N/A | N/A | N/A | 0.14 | 0.08 | 0.10 | 0.28 |
| Zn | N/A | N/A | N/A | N/A | 0.29 | 0.15 | 0.12 | 0.25 |
| S | N/A | N/A | N/A | N/A | 0.02 | 0.02 | 0.02 | 0.02 |
| P | N/A | N/A | N/A | N/A | 0.73 | 0.49 | 0.43 | 0.71 |

From these results, it can be seen that the close-coupled TWC-coated flowthrough substrate collected poisons to the same extent, whether a TWC-coated filter was close-coupled immediately behind the flowthrough substrate or further downstream in the underfloor position. On the close-coupled filter (no upstream flowthrough close-coupled TWC), 13 g of poisons were collected; typical of what would be seen on a (flowthrough) close-coupled TWC after full-life vehicle durability trials. Ash deposits were visible on the inlet face (as orange deposits) and the surface of the washcoat (some brown staining at the downstream end of the inlet channels). There was no plugging or build-up of ash and the filter retained its efficiency, comfortably meeting the Euro 6 emissions standard, including the particle number limit of $6.0 \times 10^{11}$. When placed behind a close-coupled flowthrough TWC in a "two brick" configuration, ash deposits in the filter were reduced by 80%, and backpressure and emissions were also significantly lower than the system including no close-coupled flowthrough TWC upstream of the filter (results not shown).

From these results it can be seen that a filter coated with a TWC composition can become poisoned at the inlet end of washcoated surfaces of inlet channels and that this pattern of poisoning is similar to that seen in a TWC coated on a flowthrough substrate, despite the fluid flow characteristics between a wallflow filter being different from that of a flowthrough substrate, e.g. greater mass transfer in a filter.

For the avoidance of any doubt, the entire contents of all prior art documents cited herein is incorporated herein by reference.

The invention claimed is:

1. A catalysed filter for filtering particulate matter from exhaust gas comprising one or more catalyst poisons and emitted from a positive ignition internal combustion engine, which filter comprising a porous substrate having a total substrate length and having inlet surfaces and outlet surfaces, wherein the inlet surfaces are separated from the outlet surfaces by a porous structure containing pores of a first mean pore size, wherein the porous substrate is coated with a washcoat comprising a plurality of solid particles, wherein the porous structure of the washcoated porous substrate contains pores of a second mean pore size, wherein the second mean pore size is less than the first mean pore size, which washcoat being axially arranged on the porous substrate as a first zone comprising the inlet surfaces of a first substrate length less than the total substrate length and a second zone comprising the outlet surfaces of a second substrate length less than the total substrate length, wherein the sum of the substrate length in the first zone and the substrate length in the second zone ≥100%, wherein the washcoat of at least the second zone is a three-way catalyst washcoat comprising one or more precious metal supported on a high surface area base metal oxide, and an oxygen storage component and wherein:
   (i) a specific surface area of washcoat in the first zone>second zone; or
   (ii) both a washcoat loading and a specific surface area of washcoat in the first zone>second zone.

2. A catalysed filter according to claim 1, wherein the specific surface area of washcoat in the first zone is provided by one or more of optionally stabilised alumina, silica, titania, ceria, optionally doped ceria-zirconia composite oxide, optionally doped ceria-zirconia mixed oxide and zeolite.

3. A catalysed filter according to claim 1, wherein the specific surface area in the first zone is >50 m$^2$/g.

4. A catalysed filter according to claim 1, wherein the washcoat loading in the first zone is >1.60 gin$^{-3}$.

5. A catalysed filter according to claim 1, wherein the substrate length in the first zone is <the substrate length in the second zone.

6. A catalysed filter according to claim 5, wherein the substrate zone length in the first zone is <45% of the total substrate length.

7. A catalysed filter according to claim 1, wherein a total precious metal loading in the first zone <second zone.

8. A catalysed filter according to claim 1, wherein the total precious metal loading in the first zone is <50 gft$^{-3}$.

9. A catalysed filter according to claim 1, wherein the one or more precious metal is selected from the group consisting of (i) platinum and rhodium; (ii) palladium and rhodium; (iii) platinum, palladium and rhodium; (iv) palladium only; and (v) rhodium only.

10. A catalysed filter according to claim 1, comprising a surface washcoat, wherein a washcoat layer substantially covers surface pores of the porous structure and the pores of the washcoated porous substrate are defined in part by spaces between the particles (interparticle pores) in the washcoat.

11. A catalysed filter according to claim 10, wherein a D90 of solid washcoat particles is in the range 0.1 to 20 μm.

12. A catalysed filter according to claim 1, wherein the washcoat sits substantially within the porous structure of the porous substrate.

13. A catalysed filter according to claim 1, wherein the mean size of the solid washcoat particles is in the range 1 to 40 μm.

14. A catalysed filter according to claim 1, wherein the porous substrate is a wall-flow filter.

15. A catalysed filter according to claim 1, wherein the uncoated porous substrate has a porosity of >40%.

16. A catalysed filter according to claim 1, wherein a first mean pore size of the porous structure of the uncoated porous substrate is from 8 to 45 μm.

17. An exhaust system for a positive ignition internal combustion engine comprising a catalysed filter according to claim 1, wherein the first zone is disposed upstream of the second zone.

18. An exhaust system according to claim 17, comprising a flow through monolith substrate comprising a three-way catalyst composition disposed upstream of the catalysed filter.

19. A positive ignition engine comprising an exhaust system according to claim 17.

20. A method of simultaneous conversion of carbon monoxide, hydrocarbons, oxides of nitrogen and particulate matter in exhaust gas comprising one or more catalyst poison emitted from a positive ignition internal combustion engine using a catalysed filter comprising a porous substrate having a total substrate length and coated with a three-way catalyst washcoat, which method comprising the step of contacting the exhaust gas with the catalysed filter by trapping at least some of the one or more catalyst poison in a first zone comprising inlet surfaces of a first substrate length less than the total substrate length and a second zone comprising outlet surfaces of a second substrate length less than the total substrate length, wherein the sum of the substrate length in the first zone and the substrate length in the second zone≥100%, wherein the washcoat of at least the second zone is a three-way catalyst washcoat comprising one or more precious metal supported on a high surface area base metal oxide, and an oxygen storage component and wherein:
   (i) a specific surface area of washcoat in the first zone>second zone; or
   (ii) both a washcoat loading and a specific surface area of washcoat in the first zone>second zone.

* * * * *